United States Patent
Harrington et al.

(10) Patent No.: US 9,581,135 B2
(45) Date of Patent: Feb. 28, 2017

(54) CABLE-SUSPENDED WIND ENERGY GENERATOR

(71) Applicant: Harrington Electronics LLC, Dexter, MI (US)

(72) Inventors: Richard H. Harrington, Dexter, MI (US); Ryan Klock, Ypsilanti, MI (US)

( * ) Notice: Subject to any disclaimer, the term of this patent is extended or adjusted under 35 U.S.C. 154(b) by 71 days.

(21) Appl. No.: 14/086,658

(22) Filed: Nov. 21, 2013

(65) Prior Publication Data

US 2014/0152018 A1 Jun. 5, 2014

Related U.S. Application Data

(60) Provisional application No. 61/728,941, filed on Nov. 21, 2012.

(51) Int. Cl.
  *F03D 9/00* (2016.01)
  *F03D 5/02* (2006.01)

(52) U.S. Cl.
  CPC .......... *F03D 5/02* (2013.01); *F05B 2240/917* (2013.01); *Y02B 10/30* (2013.01); *Y02E 10/70* (2013.01); *Y02E 10/725* (2013.01); *Y02E 10/728* (2013.01)

(58) Field of Classification Search
  CPC ..... F03D 5/02; F03D 5/04; F03D 5/06; F05B 2240/917
  USPC ............ 290/44, 55; 415/4.1, 2.1; 416/132 B; 104/24
  See application file for complete search history.

(56) References Cited

U.S. PATENT DOCUMENTS

| | | | |
|---|---|---|---|
| 23,277 A | 3/1859 | Thomas | |
| 1,791,731 A * | 2/1931 | Madarasz | ............... F03D 3/007 290/4 R |
| 4,553,037 A | 11/1985 | Veazey | |
| 4,572,962 A | 2/1986 | Shepard | |
| 4,589,344 A | 5/1986 | Davison | |
| 4,730,119 A | 3/1988 | Biscomb | |
| 4,756,666 A * | 7/1988 | Labrador | ........................... 416/8 |
| 4,832,569 A | 5/1989 | Samuelsen et al. | |
| 4,859,146 A | 8/1989 | Labrador | |
| 5,040,948 A | 8/1991 | Harburg | |

(Continued)

FOREIGN PATENT DOCUMENTS

| | | | |
|---|---|---|---|
| GB | 2131490 A * | 6/1984 | ............... F03D 5/02 |
| IT | EP 2078853 A1 * | 7/2009 | ............... F03D 5/04 |

*Primary Examiner* — Julio Gonzalez
(74) *Attorney, Agent, or Firm* — John G. Posa; Belzer PC

(57) ABSTRACT

An electrical generation system is based upon sail craft that move between towers through wind power. The system includes at least two support towers (or support structures on buildings, for example), and upper and lower cables extending from one tower to another. At least one sail craft is coupled to the upper and lower cables such that wind moves the sail craft along the cables. Each sail craft is coupled to the upper and lower cables with respective upper and lower modules, one or both of which includes a wheel that rotates as the craft moves along the cables. The wheel is coupled to an electrical generator that that feeds one or both of the cables for further distribution through at least one of the towers. A structure at each tower causes the craft to reverse its direction and travel back and forth between the towers in such a way that sail craft travelling in opposite directions to not block the wind to other craft.

10 Claims, 17 Drawing Sheets

(56) References Cited

U.S. PATENT DOCUMENTS

| | | | |
|---|---|---|---|
| 5,454,694 A | 10/1995 | O'Dell | |
| 5,525,037 A | 6/1996 | Cummings | |
| 5,758,911 A * | 6/1998 | Gerhardt | 290/55 |
| 6,749,393 B2 | 6/2004 | Sosonkina | |
| 6,877,693 B1 | 4/2005 | Barbarie | |
| 2003/0001393 A1 | 1/2003 | Staikos et al. | |
| 2007/0176430 A1 | 8/2007 | Hammig | |
| 2008/0007069 A1* | 1/2008 | Diederich | 290/55 |
| 2008/0157526 A1* | 7/2008 | Davison et al. | 290/3 |
| 2008/0191484 A1* | 8/2008 | Okubo et al. | 290/44 |
| 2009/0146434 A1 | 6/2009 | Fernandez | |
| 2011/0163551 A1* | 7/2011 | King et al. | 290/55 |
| 2011/0198857 A1* | 8/2011 | Becker | 290/55 |
| 2012/0066154 A1* | 3/2012 | Harrington | 705/412 |
| 2012/0306215 A1* | 12/2012 | Wesby | F03D 3/005 290/55 |
| 2014/0175797 A1* | 6/2014 | Roseman | 290/44 |

\* cited by examiner

Orthographic view:

Front view:

Right view:

31

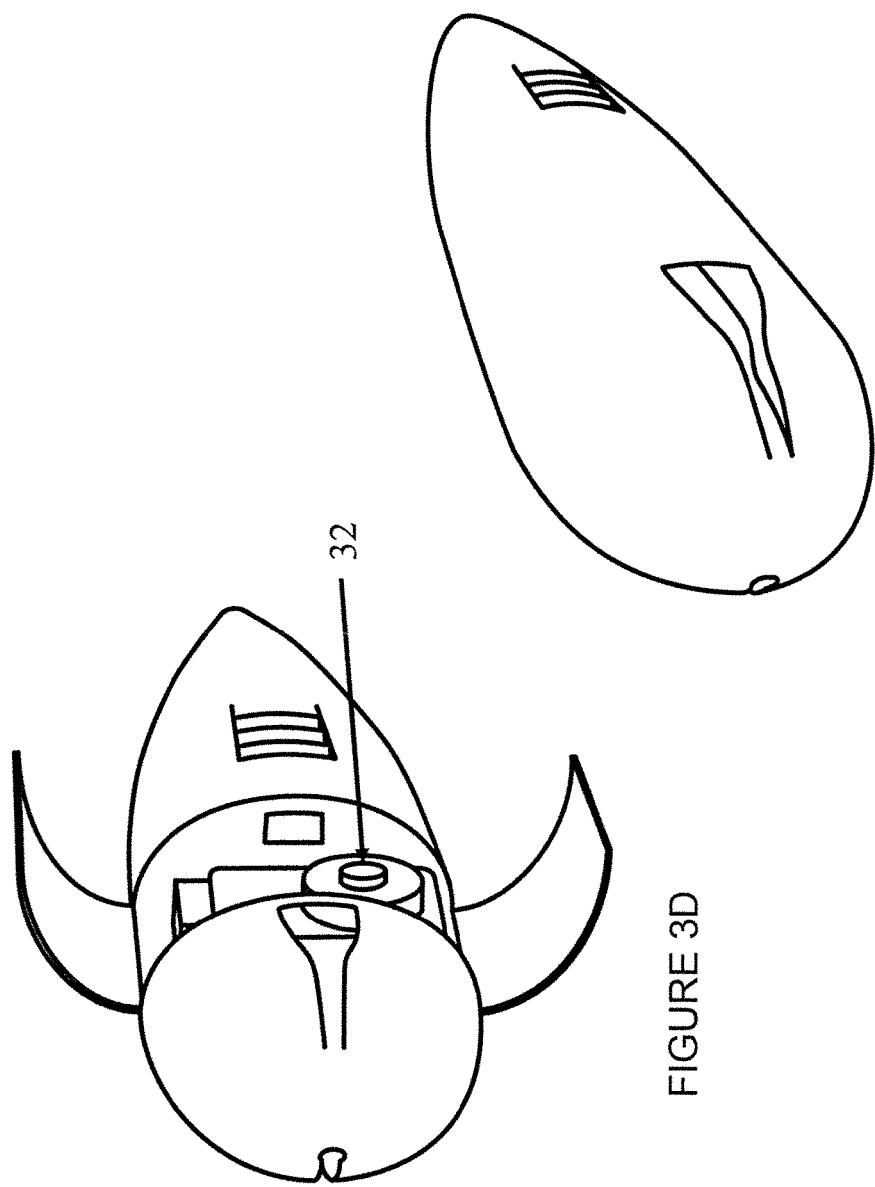

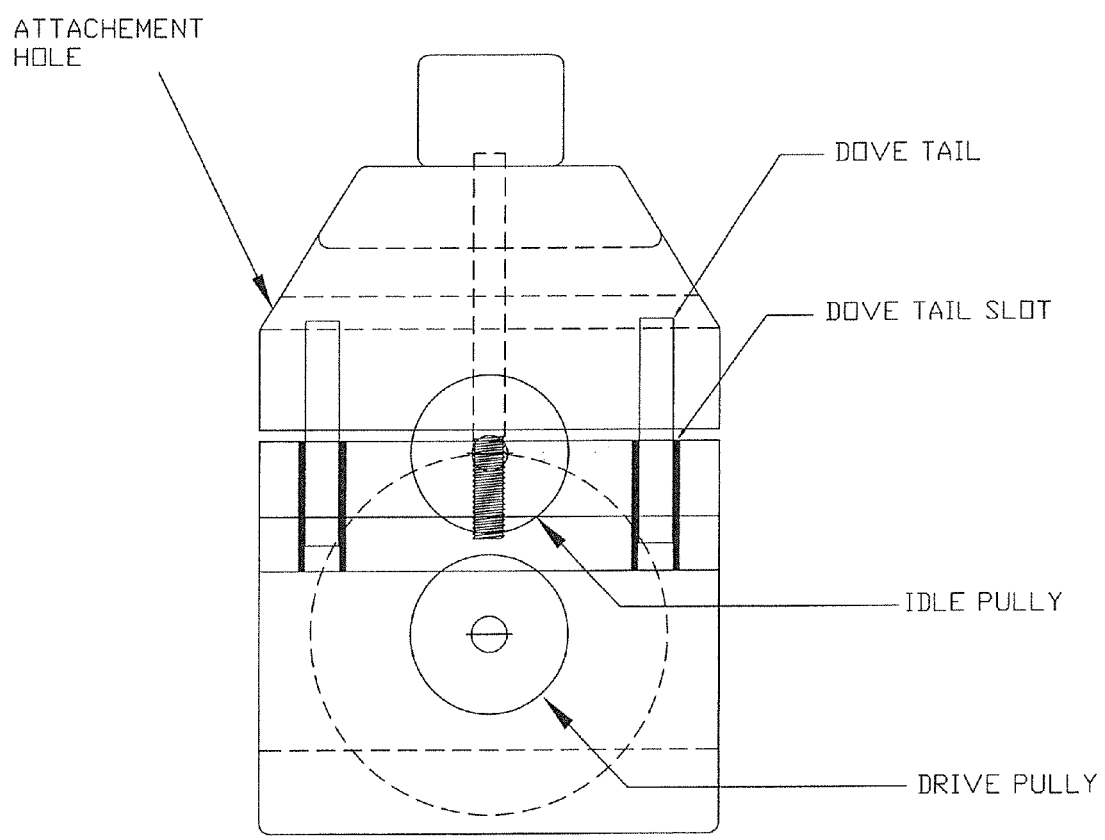

CABLE-SUSPENDED WIND ENERGY GENERATOR

REFERENCE TO RELATED APPLICATION

This application claims priority from U.S. Provisional Patent Application Ser. No. 61/728,941, filed Nov. 21, 2012, the entire content of which is incorporated herein by reference.

FIELD OF THE INVENTION

This invention relates generally to wind power and, in particular, to an electrical generation system based upon sail craft that move between towers through wind power.

BACKGROUND OF THE INVENTION

The advantages of wind power are many. It is widely available and does not require flowing water or sources of fuel. Harnessing the wind dates back to the first sailboat. Wind-powered machines have ground grain and pumped water for hundreds of years. With the development of electricity, wind power found new applications in lighting buildings remote from centrally-generated power. Throughout the 20th century, small wind plants evolved for farms and residences, while larger utility-scale wind generators were connected to electricity grids for power in remote locations.

Today, wind powered generators range in size from small plants for battery charging at isolated residences, to expansive offshore wind farms that provide electricity to national electrical networks. Multi-megawatt turbine technologies in use today include advanced aerodynamic, structural, and acoustic engineering design features such as steel tube towers, variable-speed generators, composite blade materials and partial-span pitch control. In 1987, the MOD-5B was the largest single wind turbine operating in the world with a rotor diameter of nearly 100 meters and a rated power of 3.2 megawatts.

However, not all the energy of blowing wind can be harvested, since conservation of mass requires that as much mass of air exits the turbine as enters it. Betz' law gives the maximal achievable extraction of wind power by a wind turbine as 59 percent of the total kinetic energy of the air flowing through the turbine. Further inefficiencies, such as rotor blade friction and drag, gearbox losses, generator and converter losses, reduce the power delivered by a wind turbine. Commercial utility-connected turbines deliver about 75 percent of the Betz limit of power extractable from the wind, at rated operating speed.

Conventional wind turbines face a number of obstacles, including intermittency, space requirements, complaints from homeowners; as such, alternative technologies are being given more serious consideration. One alternative is the airborne generator, the basic premise of which is to tether a device to the ground and let it fly around in the strong winds like a kite, either generating power and sending it down a tether to the ground or using the tether itself to produce electricity at its base.

One example, the Ampyx's PowerPlane, is a glider that generates electricity by pulling on its tether, which is connected to a ground-mounted generator. The PowerPlane glides around between 1,000 and 2,000 feet; the next iteration of this design should generate 250 to 500 kilowatts continuously. There are also inflatable designs, as well as a soft-wing kite design from North Carolina-based Windlift that uses a 40-square-meter wing flying at a maximum altitude of 500 feet, with the controls and generator on the ground.

But scaling up airborne prototypes will not be easy without strong government support. In order to be viable, airborne devices would need to stay aloft for long periods of time with little maintenance required. Another challenge is regulation, since airborne systems are so large and consume such a large volume of airspace.

SUMMARY OF THE INVENTION

This invention resides in an electrical generation system based upon sail craft that move between towers through wind power. A wind energy generator constructed in accordance with the invention comprises at least two support towers extending up from the ground and upper and lower cables extending from one tower to another. At least one sail craft is coupled to the upper and lower cables such that wind moves the sail craft along the cables. Each sail craft is coupled to the upper and lower cables with respective upper and lower modules, one or both of which includes a wheel that rotates as the craft moves along the cables. The wheel is coupled to an electrical generator that that feeds one or both of the cables for further distribution through at least one of the towers.

A structure at each tower causes the craft to reverse its direction and travel back and forth between the towers. In the preferred embodiment, the system includes four cables between the towers, including an upper pair of cables and a lower pair of cables. The structure at the end towers causes each craft to reverse its direction is a spiral track interconnecting the upper and lower cables, causing the sail craft to travel to one tower on the upper pair of cables and travel to the other tower on the lower pair of cables. In this way, sail craft travelling in opposite directions to not block the wind to other craft. There may also be support towers like the center tower shown in FIG. 14. There may be one or more cable support towers that are placed between the end towers that do not cause the cable sailor to turn around.

Each craft further preferably includes a mast extending between the upper and lower modules, with at least one having a forward edge connected to the mast. In the preferred embodiment, each sail is an elliptical sail, and more preferably, each craft uses upper and lower mirrored elliptical sails connected to the mast. A boom may be provided which extends outwardly from the mast and terminates in a distal end, and wherein a portion of the sail is fastened to the boom. In this configuration, upper and lower trailing modules that ride along the upper and lower cables, with a vertical cable extending between the upper and lower trailing modules. A mechanism disposed at the distal end of the boom includes a pulley for engaging a portion of the vertical cable and a motor for operating the pulley to change the angle of the boom relative to the upper and lower cables.

The system may further include one or more sensors for determining wind direction or wind speed, and an electronic controller operative to adjust the angle of the boom as a function of wind direction or wind speed. One or more sensors may be used for determining the power output of each generator, with the electronic controller being operative to adjust the speed of the sail craft or generator loading to maximize power output. In preferred embodiments, the generator functions as a motor/generator, with the electronic controller being operative to switch between motor and generator modes of operation, including the ability to stop the movement of a sail craft or cause a sail craft to move to a tower for maintenance.

BRIEF DESCRIPTION OF THE DRAWINGS

FIG. 3D illustrates a motor/generator module with an open side;

FIG. 3E is a view of a motor/generator module seen from a different perspective;

FIG. 5B is a side detail drawing of the motor/generator assembly of FIG. 5A;

DETAILED DESCRIPTION OF THE INVENTION

Figure 1:
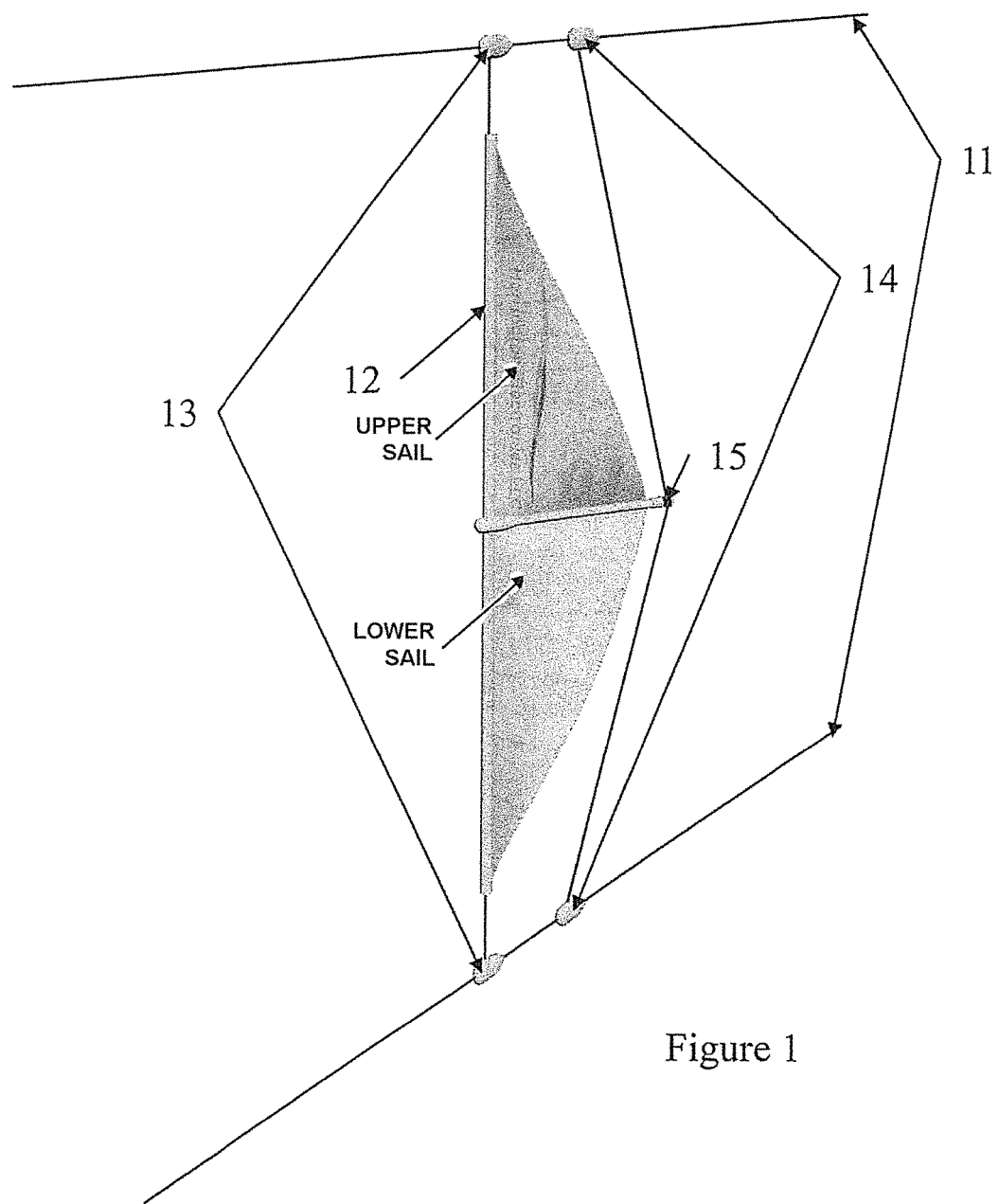
FIG. 1 is a drawing of a sail craft constructed in accordance with the invention.

This invention is directed to a wind energy system referred to herein as the "cable sailor." The cable sailor craft (FIG. 1) is a wind energy device that travels along cables suspended above the ground by support towers. A minimum of two parallel cables (11) are required to support the cable sailor craft and carry electrical power generated or received by the cable sailor craft to the power grid. The two cables are attached to the cable sailor craft and separated vertically by a distance equal to the mast (12) of the cable sailor craft plus some additional distance needed for compliance to account for uneven cable sag.

Figure 2A:
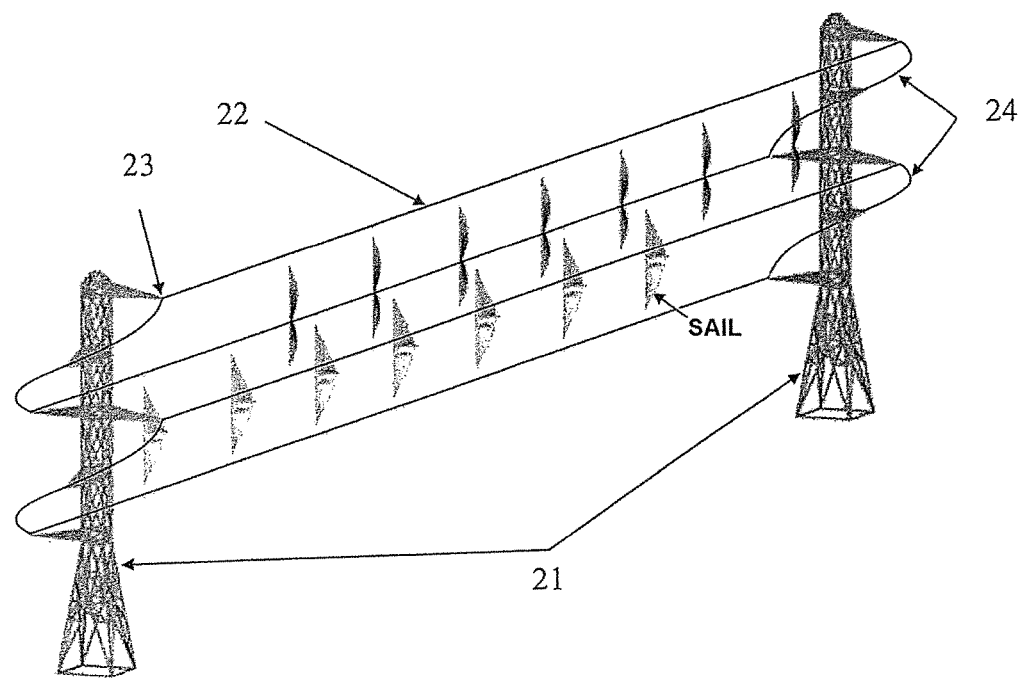
FIG. 2A is a system overview from an orthographic perspective.
Figure 2B:
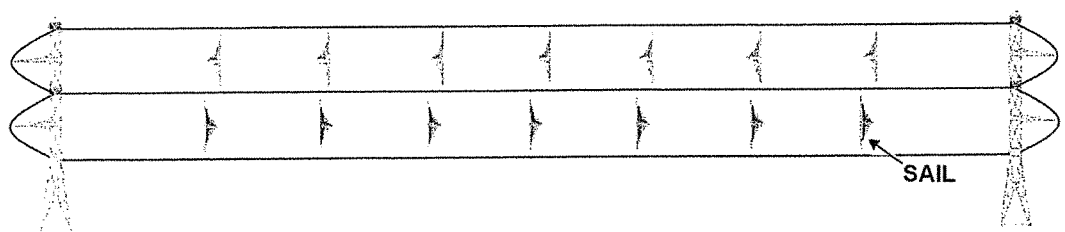
FIG. 2B is a side view of the system.
Figure 2C:
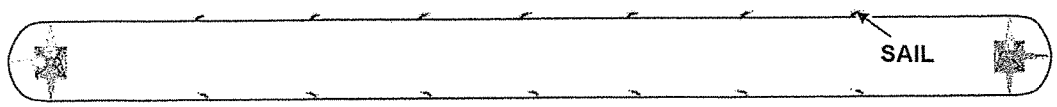
FIG. 2C is a top view of the system

In the simplest form, the cable sailor system requires only two support towers (FIG. 2). The support towers (21) would nominally be positioned such that the cables (22) suspended between the support towers are perpendicular or at least transverse to the prevailing winds. The suspended cables are attached to the support towers by a round section of steel (23) or other high-strength material that guides the cable sailor in a 180 degree turn at the end of each cable sailor system. The helical turn rails (24) redirect the cable sailor craft 180 degrees and raise or lower the cable sailor craft altitude. The change in altitude is intended to prevent wind blockage by passing cable sailor craft. The suspended cables will typically be a high tensile stainless steel to prevent corrosion and carry electrical power to or from the cable sailor craft.

Figures 3A, 3B, 3C:
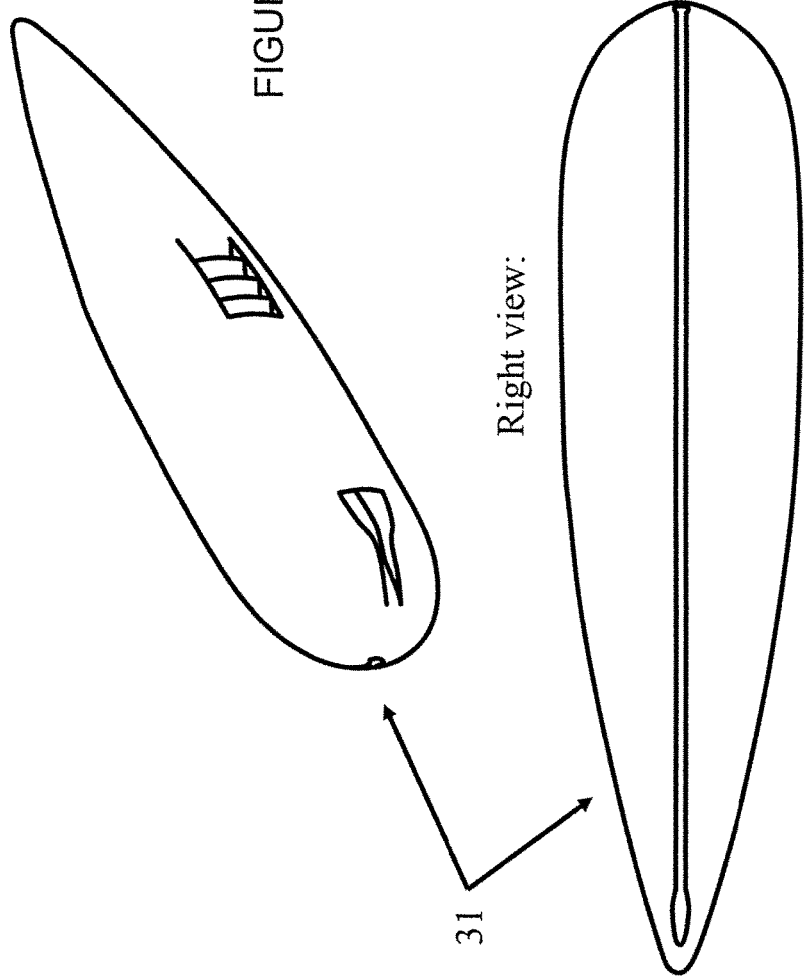
FIG. 3A is an orthographic illustration of a motor/generator module.
FIG. 3B is a right side view of the motor/generator module.
FIG. 3C is a front view of the motor/generator module.
Figure 4:
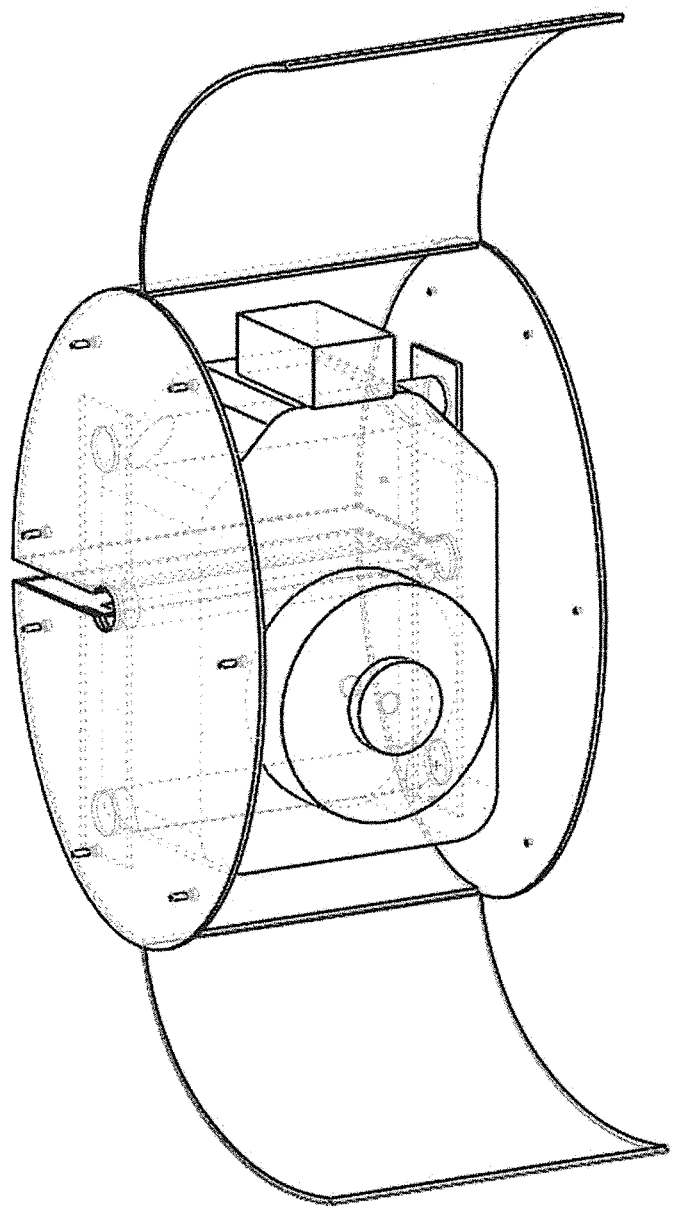
FIG. 4 depicts a motor/generator assembly.
Figure 5A:
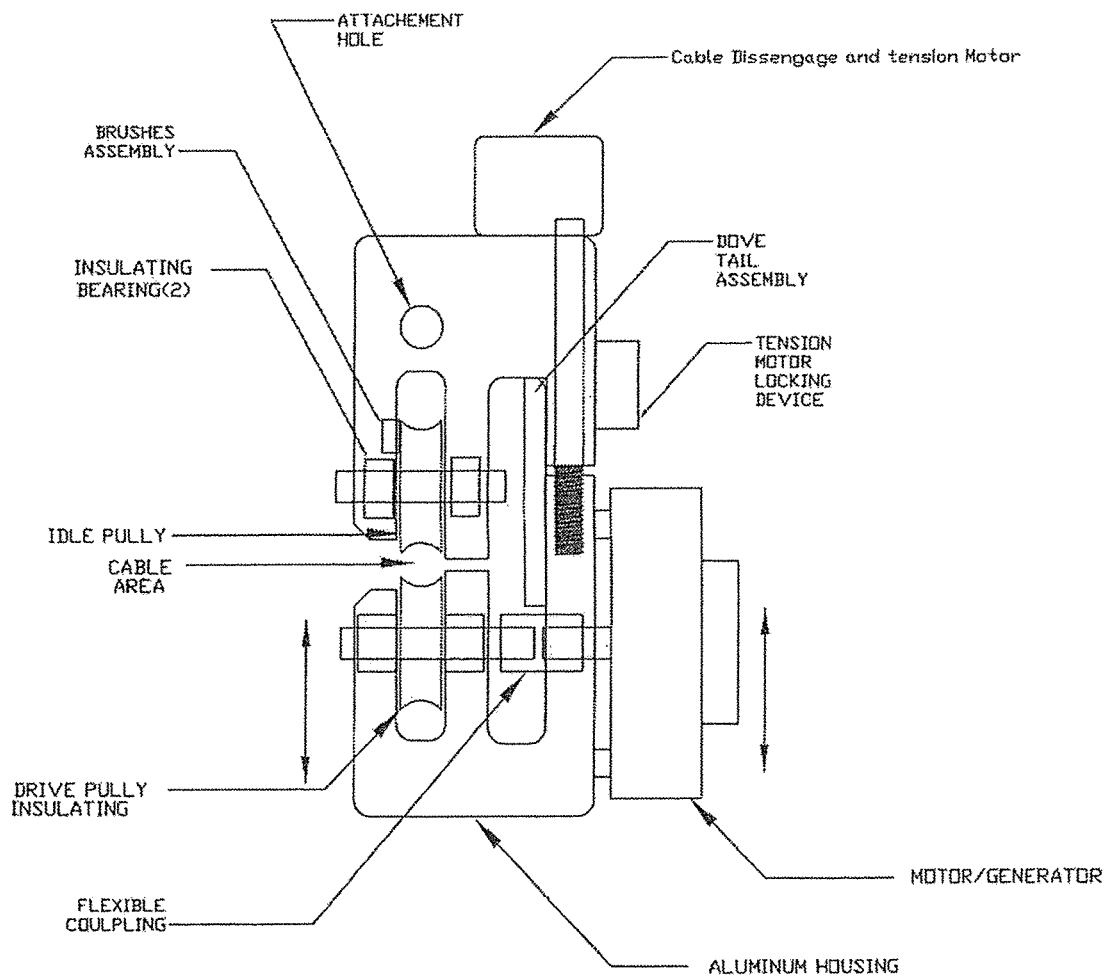
FIG. 5A is a frontal, detail drawing of a motor/generator assembly.

The cable sailor craft generates electrical power through two or more teardrop shaped motor/generator (MG) modules (31 shown in FIG. 3). The MG modules contain one or more alternating or direct current, radial or pancake electrical motor/generators (32) (FIGS. 4 and 5). In one embodiment, each motor/generator is rated for between 10 and 20 horsepower, or in alternative units, 7.5 to 15.0 kW. Multiple motor generators within each MG module may be used to increase the power output of an individual cable sailor craft while not compromising the tear drop shape of the MG module.

As an example, consider a single cable sailor craft in a 30 mile per hour crosswind, with two of its MG modules each containing four motor/generators producing electrical power at a rate of 15 horse power. By simple arithmetic we see that the cable sailor craft is producing nearly 94 kilowatts of electrical power. Furthermore, by considering that multiple cable sailor craft may occupy the same suspended cable and support tower system, we see that nearly 1 mega-watt of electrical power may be produced by as few as 11 cable sailor craft.

Each cable sailor craft will actively monitor and control the generated electrical voltage phase such that the electrical power is transferred to the upper and lower suspended cables. If the electrical voltage phase is not actively monitored, high circulating currents may flow within the suspended cables and dissipate the generated electrical power as wasted heat. This voltage monitoring and control will be carried out by a system central, or cable sailor craft embedded computer that controls power switching devices such as insulated-gate bipolar transistors.

Figure 6:
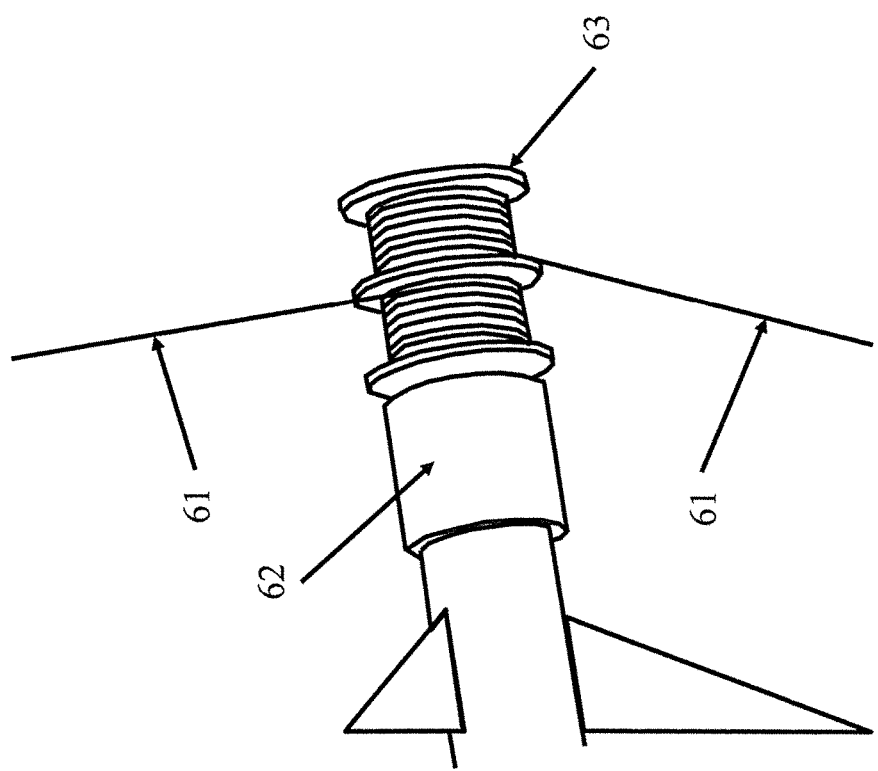
FIG. 6 illustrates a boom deployment system.

The trailing MG modules contain idler pulleys (14) which ride along the suspended cables and are connected to smaller diameter cables (61) which run to the Boom Deployment (BD) system (15) (FIG. 6). The BD system is composed or an electrical servo motor (62) that drives a cable spindle separated into two sections (63). Each section of the cable spindle is fastened to and contains the spooled cable that runs to the upper and lower trailing MG modules. The electrical servo motor is controlled by an embedded computer that accounts for various input variables such as electrical power generation output, apparent wind speed, apparent wind direction, cable sailor craft speed, and inter cable sailor craft distance.

The embedded computer calculates the appropriate boom angle and directs the electrical servo motor to let out or spool the cable accordingly. When executing a turn at the end of the cable sailor system, the BD system will act to spool the cable, bringing the boom to mid craft and preventing the boom from swinging violently from one side to another due to the change in apparent wind direction. To perform these actions, the cable sailor embedded controller will operate in two distinct modes.

The first mode will be used as the cable sailor travels between supporting towers and is generating power. During this time, a vane anemometer determines the apparent wind direction and speed with respect to the moving cable sailor craft and feeds this information to the embedded controller. The embedded controller will then process the apparent wind direction and speed using an algorithm tailored to the particular locale and actuate the BD system to achieve the appropriate boom angle. The position of the BD system electrical servo motor, and corresponding angle of the boom, will typically be detected using a commercially available optical shaft encoder or Hall Effect sensor. These particular sensors are well suited to this application due to their nearly solid-state design, aside from the bearings and shaft of the optical encoder or Hall Effect sensor.

In addition, voltage and current sensors will be used to determine the power output conditions of the electrical generators and the embedded controller will adjust the cable sailor craft speed and generator loading to provide peak power output without overloading any of the electrical or mechanical systems. In the event of a failure by the vane anemometer, the voltage and current sensors may be used to determine the cable sailor craft's speed and bring the craft safely to a stop or a location designated for maintenance. Ideally, the cable sailor craft will be equipped with redundant sensors for the most important functions.

The second mode will be used as the cable sailor rounds the turn at the end of each cable sailor system. Here the supporting cables terminate and the cable sailor craft is transitioned to a pair of helical turn rails which allow the cable sailor craft to execute a 180 degree turn before returning in the direction from which it came. During this turn, the embedded controller will no longer attempt to maximize electrical power generation by the electrical generators, but will instead instruct the BD system to swing the boom in a controlled manner to a position suited for traveling in the opposite direction. This motion is analogous to a sail boat executing a "tack" maneuver.

The supporting towers would typically be at least 300 feet tall to reach the more quickly moving air beyond the air boundary layer at ground level. Alternatively, the cable sailor system may be suspended between tall neighboring buildings. Depending on their particular geometry, the buildings may act to accelerate the nearby wind which in turn drives the cable sailor craft, increasing the maximum possible electrical power output. Furthermore, by situating the cable sailor system near electrical power consuming communities, the voltage drop (IR-drop) that would normally occur from long distance electrical power transmission may be mitigated. The overall benefit would be to lower energy cost and reduce electrical energy dissipated into waste heat.

Figure 7:
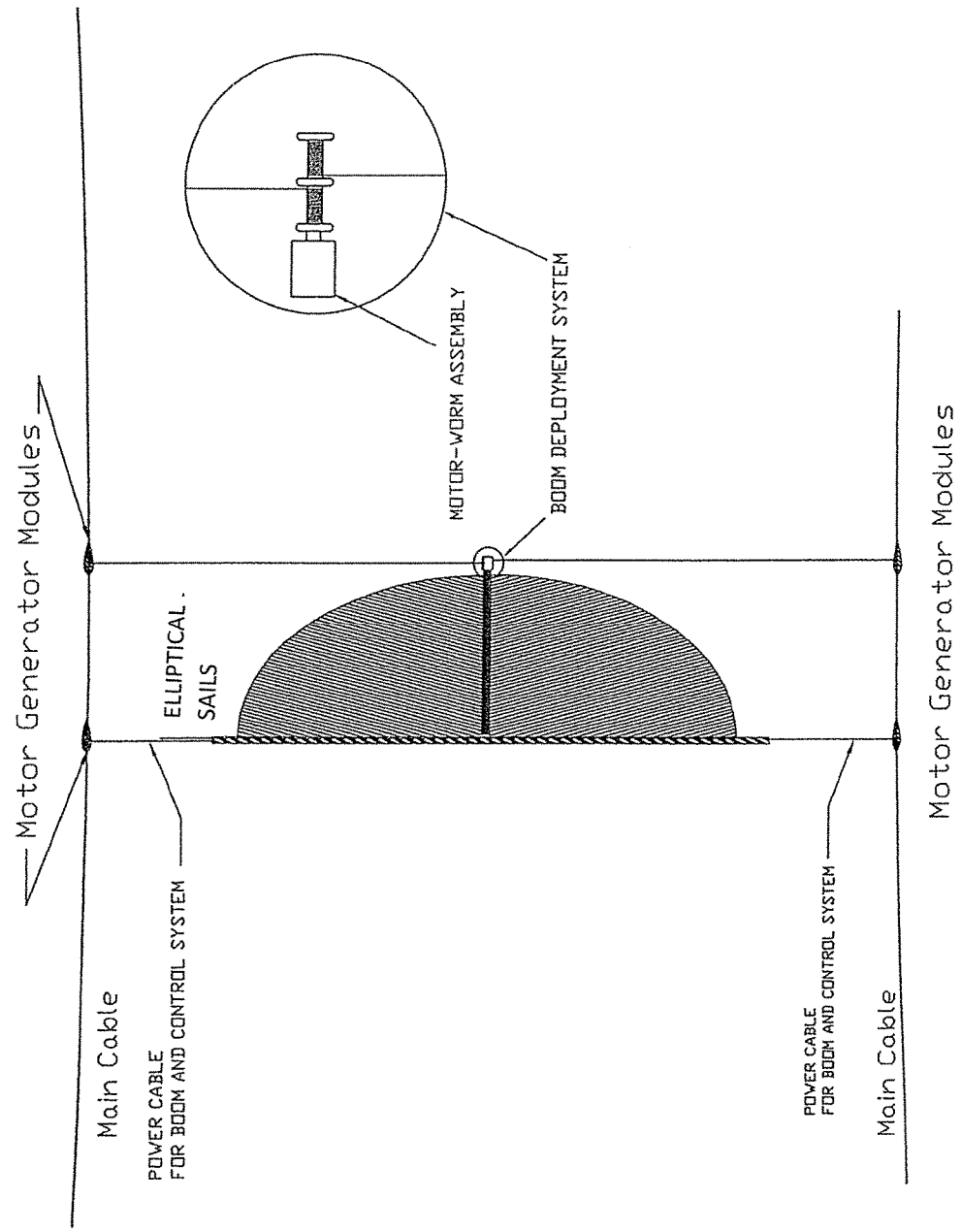
FIG. 7 is a detail drawing of a sail craft.

The cable sailor craft ideally has mirrored elliptical sails (FIG. 7). The elliptical sail shape was determined to be the most effective at capturing wind energy as compared to other traditional sail shapes. Compared to a triangular shaped sail of equal area, the elliptical shaped sail was shown to be 27 percent more efficient at capturing wind energy in wind tunnel testing. Furthermore, the combination of the twin sails yields 115 percent the power of a single sail and reduces the number of motor/generators, masts, booms, and idler pulleys. The overall effect of the mirrored sail design is to reduce the complexity of the cable sailor craft by a factor of nearly two.

In cold climates, it is conceivable that ice my form on the stationary supporting cables by which the cable sailor craft travel and transmit the generated electrical power. Such ice formation could be detrimental to the cable sailor craft and power transmission by insulating the electrical contact between the cable sailor craft and the supporting cable. To mitigate this, one or more methods may be employed. The supporting cables maybe slightly heated by an induction device or a small gas flame housed within the MG modules prior to encountering the oncoming cable sailor craft. Alternatively, a scrapper device may run along the supporting cable within or attached to the MG modules.

The cable sailor system, composed of one or more cable sailor craft, the supporting cables, and supporting towers, will be electrically interfaced with the commercial power grid through one or more electrical transformers which will boost the cable sailor generated voltage to the appropriate level. In the United States of America, the commercial power grid is typically operated at 117 volts alternating current at 60 Hertz or at 220 volts alternating current at 50 Hertz in many foreign countries. As an alternative to grid interfacing, industrial or residential installations may connect directly to a dedicated cable sailor system if the situation so warrants.

Figure 8:
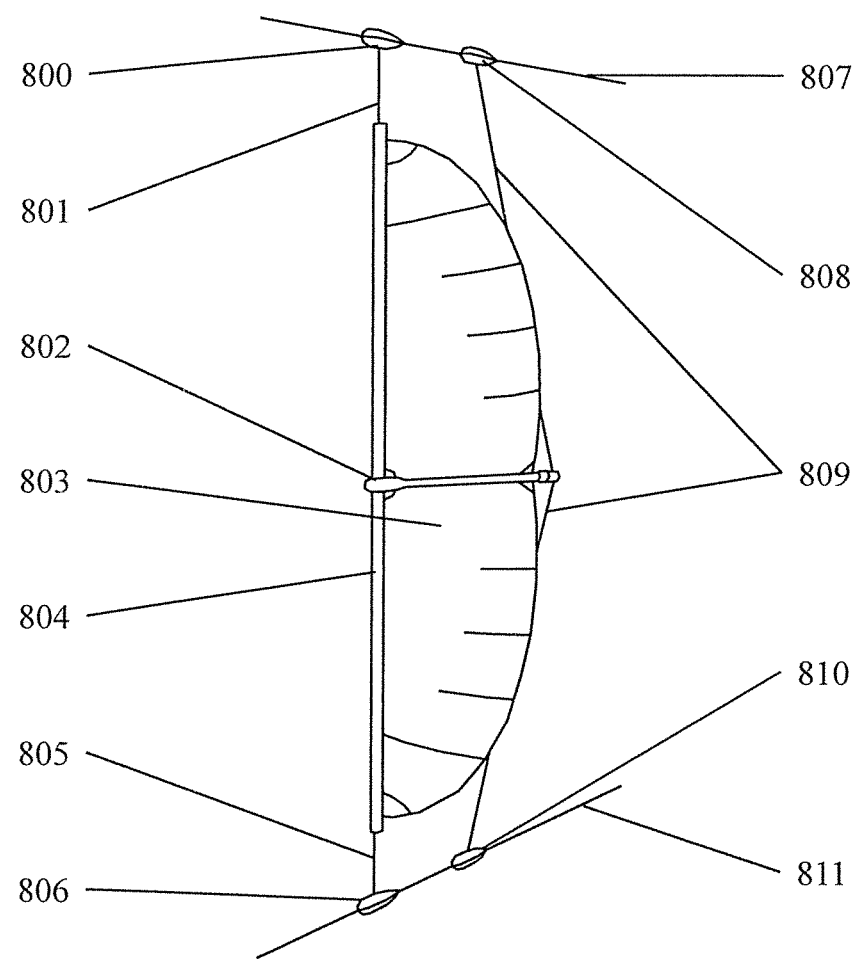
FIG. 8 is another detail drawing of a sail craft.
Figure 9:
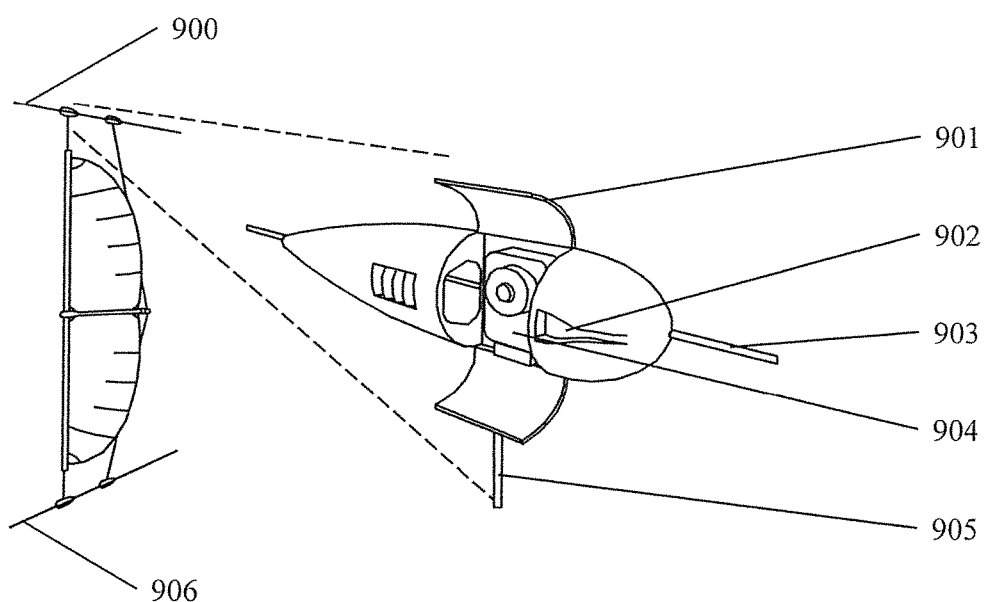
FIG. 9 depicts a motor/generator aero pod.

In FIG. 8, items 800, 806, 808 and 810 are the motor/generator housings that can be seen in more detail in FIG. 9. Items 801, 805 are cables that are used for both mechanical and electrical connections between the mast and the motor/generator pods 800 and 806. These cables may be a combination of materials such as copper and stainless steel to have both good electrical conductivity and mechanical strength. Boom/mast connector 802 may be made of a combination of wood and fiberglass, or a composite material such as carbon fiber.

Reference 803 shows the bottom of the over/under elliptical sail. This can be made of common sail cloth, or of photo/voltaic material which can be added to the motor generator voltage to further increase the power output of the cable sailor. Mast 804 may be made of an aluminum tube. If the sails are photo-voltaic, the mast is also used to carry the wire cables connecting to the photo-voltaic cells.

Figure 11:
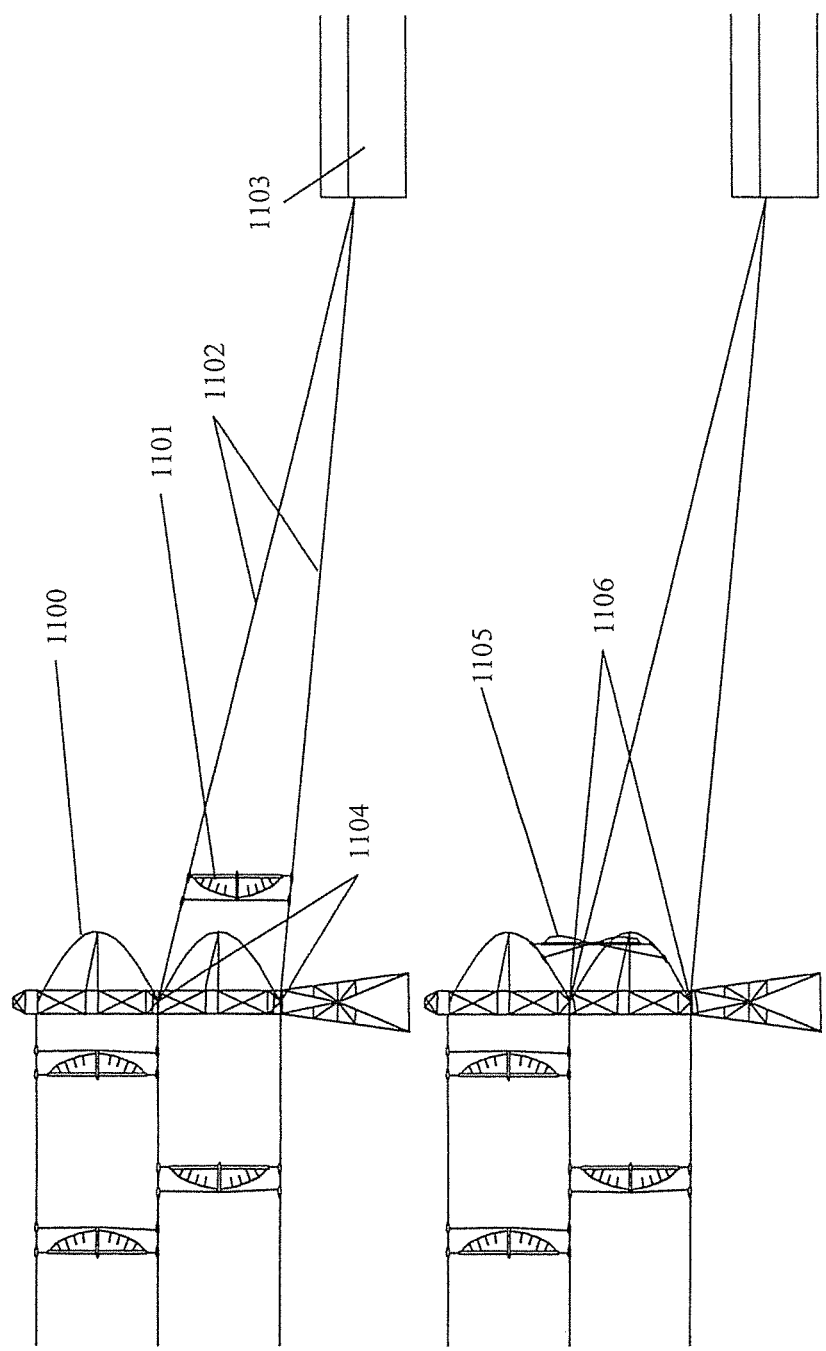
FIG. 11 illustrates turn-around towers also shown in FIGS. 14 and 15.
Figure 14:
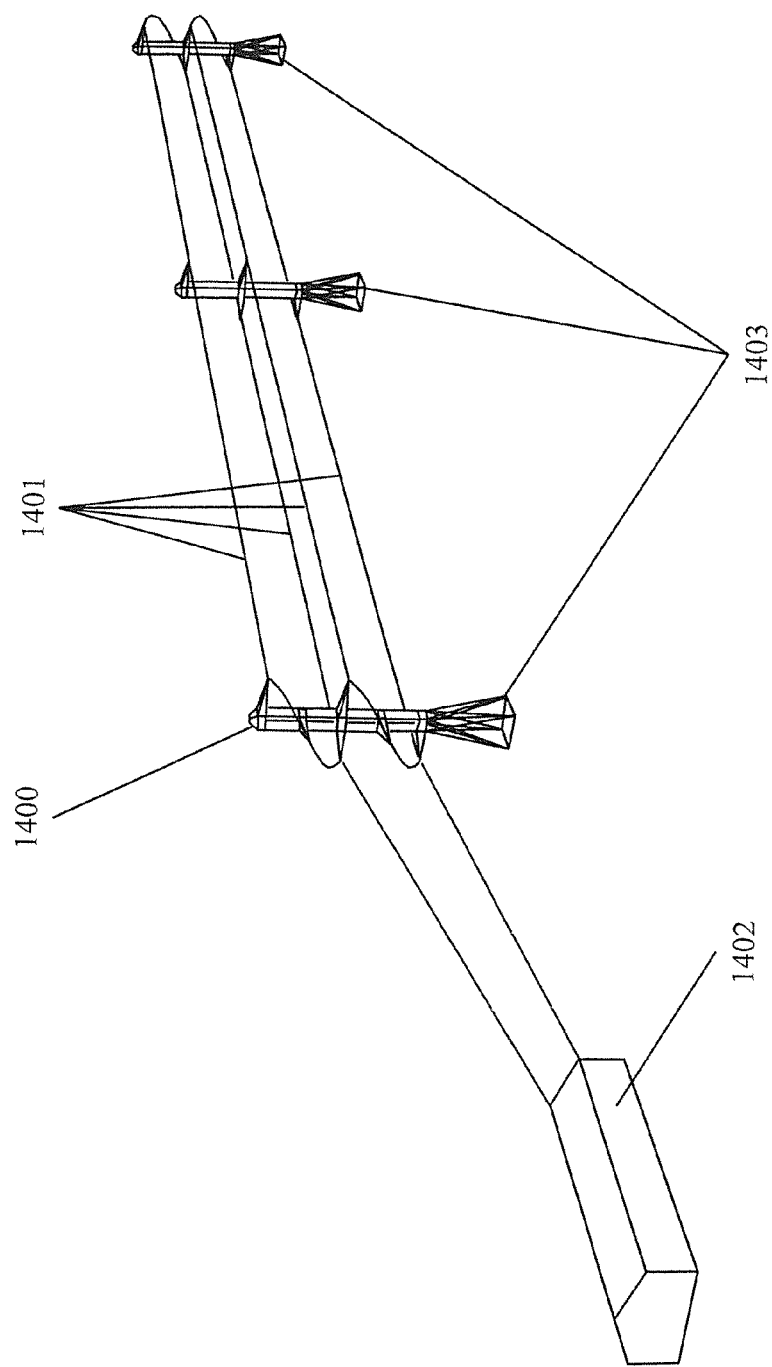
FIG. 14 shows a service station, a tower, main tower cables and tower bases.
Figure 15:
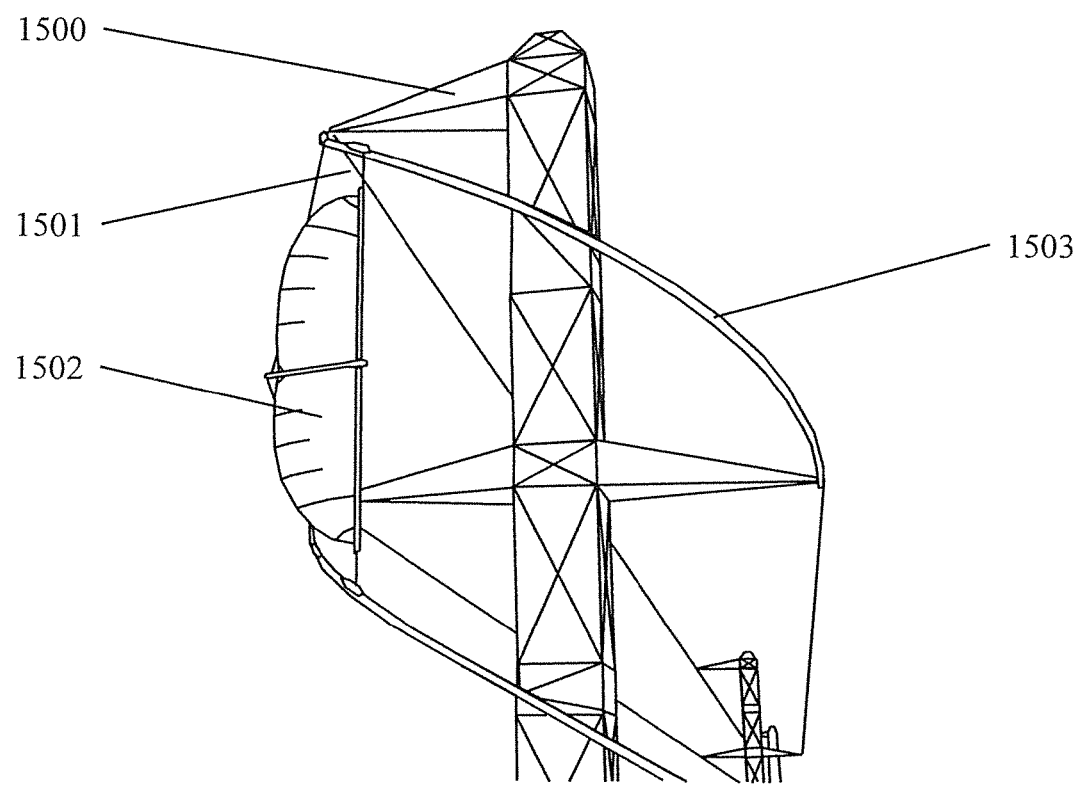
FIG. 15 illustrates a turnaround tower.

Cables 807 and 811 connect to the towers shown in FIGS. 11, 14 and 15. As mentioned, the cables serve a dual purpose, one to provide mechanical support for the cable sailors and second to carry electricity generated by primarily the cable sailors, but in some cases the power grid that the cable sailor towers are connected to. These cables may be a combination of materials such as copper and stainless steel to have both good electrical conductivity and mechanical strength. Electrically conductive cables 809 serve a dual purpose. The first is a mechanical support for the boom to the tower cables 807 and 811. The second function is to electrically connect the motor/generators contained in aeropods 808 and 810.

FIG. 9 shows the motor/generator aero pod. Reference 901 shows the top access cover in the open position. 902 is an air inlet used for cooling the motor/generators contained in the pod, and 907 is the air exit point. Item 903 is the tower main cable that the motor/generator pulley rides on. Reference 904 is the motor/generator, and 905 is the cable that connects to the mast for both mechanical support and electrical connectivity. Tower cables 900, 906 provide for both mechanical support and carrying the voltage and current to and from the motor generators to the towers.

Figure 10:
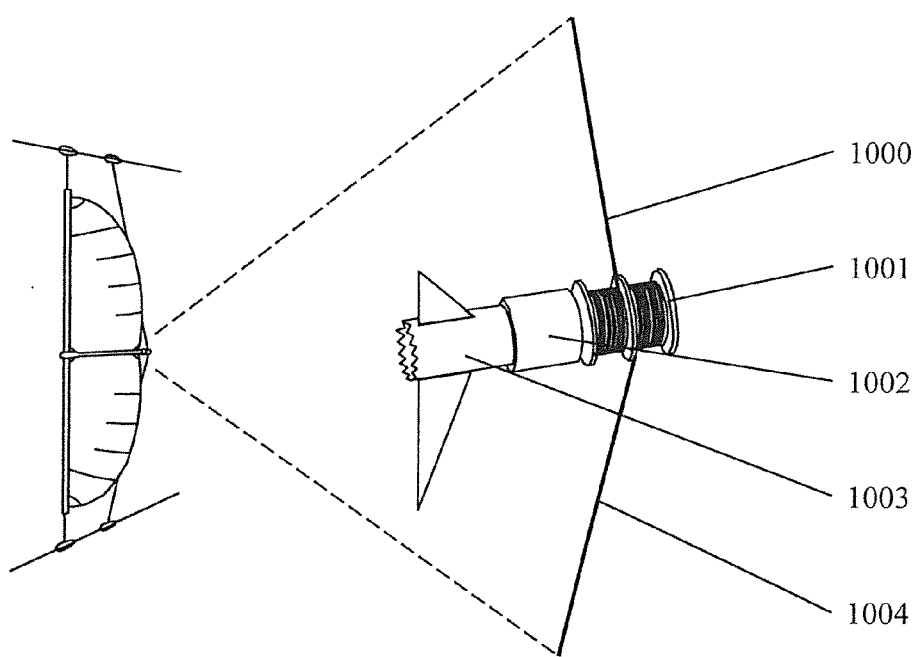
FIG. 10 shows a boom and pulley assembly.

The boom and its pulley assembly are shown in FIG. 10. The pulley 1001 is turned by the motor gearbox assembly 1002 to control the boom position. 1003 is the boom and 1000 and 1004 are the cables that connect to the motor/generator assembly. FIG. 11 shows the turn-around towers, also shown in FIG. 14. Item 1100 is a support rail for the cable sailors 1101, 1105 to both turn 180 degrees and also change altitude to prevent wind blockage to cable sailors traversing in the opposite direction. The support rail is also shown on FIG. 15 as 1503. Service cables 1102 are connected between the service station 1103 and the switch assembly 1104 and 1106. The service cables 1102 provide both mechanical support and electrical energy to the cable sailor motor/generator traversing from the Service station 1103 and the tower.

Figure 12:
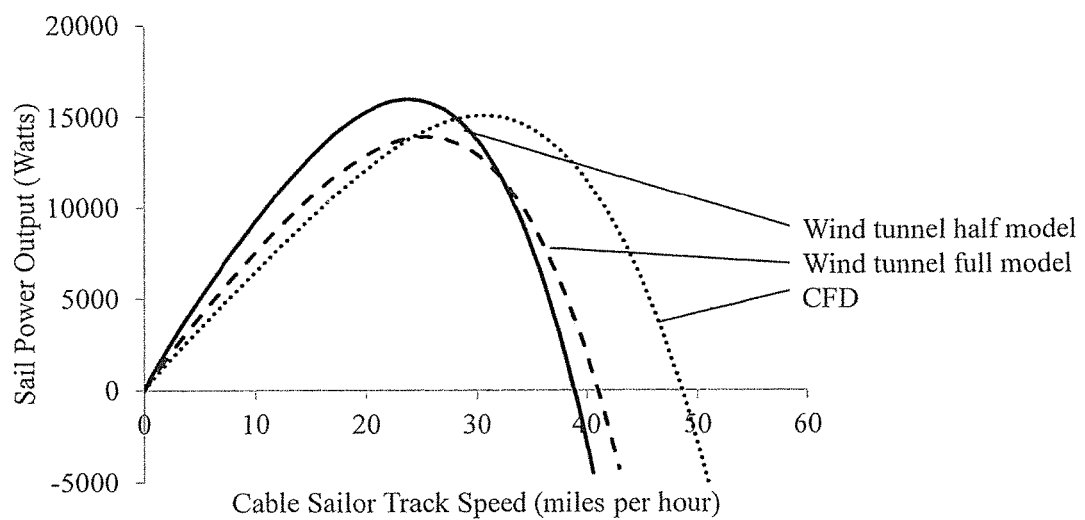
FIG. 12 is a graph that shows the cable sailor power output versus its speed along the tower cables.
Figure 13:
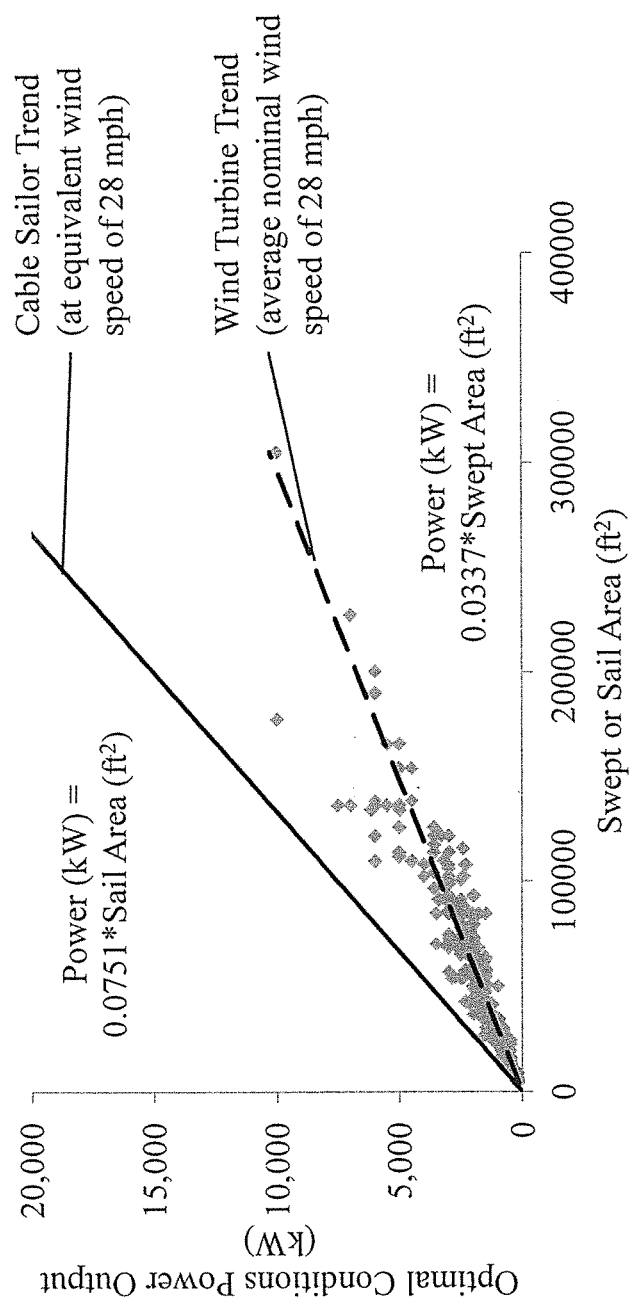
FIG. 13 shows a graph comparing the cable sailor power output and the wind turbine output with the cable sailor sail area and the wind turbine swept area being equal.

FIG. 12 is a graph that shows the cable sailor power output versus its speed along the tower cables. The three different curves show two different versions of the cable sailor in the University of Michigan 5×7 foot wind tunnel and also a Computational Fluid Dynamics (CFD) simulation. FIG. 13 is a graph comparing the cable sailor Power output and the Wind Turbine output with the cable sailor sail area and the wind turbine swept area being equal. The cable sailor exhibits a factor of 2.23 advantage over the average wind turbine power output at 28 MPH wind speed. FIG. 14 shows the service station 1402, a tower 1400, main tower cables 1401 and tower bases 1403. FIG. 15 shows a turn-around tower showing the cable sailor reversing directions as well as changing heights.

The invention claimed is:

1. A wind energy generator, comprising:
   at least two support towers;
   upper and lower cables extending from one of the towers to the other tower;
   at least one sail craft coupled to the upper and lower cables such that wind moves the sail craft along the cables;
   the sail craft being coupled to the upper and lower cables with respective upper and lower modules that move with the sail craft, one or both of the modules including a wheel that rotates as the craft moves along the cables, the wheel being coupled to an electrical generator disposed within the module such that the electrical generator also moves with the sail craft;
   electrical circuitry operative to feed the electricity produced by the generator to one or both of the cables for further distribution through at least one of the towers; and
   a structure at the endmost towers causing the craft to reverse the direction of the craft, thereby causing the craft to travel back and forth between the towers.

2. The wind energy generator of claim 1, further including:
   four cables between the towers, including an upper pair of cables and a lower pair of cables; and
   wherein the structure at each tower includes a spiral track interconnecting the upper and lower cables, thereby causing the sail craft to travel to one tower on the upper pair of cables and travel to the other tower on the lower pair of cables.

3. The wind energy generator of claim 1, further including:
   a mast extending between the upper and lower modules; and
   a sail having a forward edge connected to the mast.

4. The wind energy generator of claim 3, wherein the sail is an elliptical sail.

5. The wind energy generator of claim 3, including upper and lower elliptical sails connected to the mast, and wherein the upper and lower sails and wherein the upper and lower elliptical sails are mirror images; of one another.

6. The wind energy generator of claim 3, further including:
   a boom extending outwardly from the mast and terminating in a distal end, and wherein a portion of the sail is fastened to the boom;
   upper and lower trailing modules that ride along the upper and lower cables;
   a vertical cable extending between the upper and lower trailing modules; and
   a mechanism disposed at the distal end of the boom, the mechanism including a pulley for engaging a portion of the vertical cable and a motor for operating the pulley to change the angle of the boom relative to the upper and lower cables.

7. The wind energy generator of claim 6, further including:
   one or more sensors for determining wind direction or wind speed; and
   an electronic controller operative to adjust the angle of the boom as a function of wind direction or wind speed.

8. The wind energy generator of claim 1, further including:
   a sensor for determining the power output of each generator; and
   an electronic controller operative to adjust the speed of the sail craft or generator loading to maximize power output.

9. The wind energy generator of claim 1, wherein:
   the generator functions as a motor/generator; and
   an electronic controller operative to switch between motor and generator modes of operation, including the ability to stop the movement of a sail craft or cause a sail craft to move to a tower for maintenance.

10. The wind energy generator of claim 1, further including one or more cable support towers placed between the end towers.

* * * * *